United States Patent [19]

Häfner

[11] Patent Number: 5,455,395
[45] Date of Patent: Oct. 3, 1995

[54] PIPE CHAIN CONVEYOR

[75] Inventor: Hans W. Häfner, Aichach-Walchshofen, Germany

[73] Assignee: Pfister GmbH, Augsburg, Germany

[21] Appl. No.: 103,416

[22] Filed: Aug. 6, 1993

[30] Foreign Application Priority Data

Aug. 7, 1992 [DE] Germany ............... 42 26 188.0

[51] Int. Cl.$^6$ ............... G01G 19/00; B65B 1/30; G01F 1/78; G01F 1/84
[52] U.S. Cl. ............... 177/145; 73/861.37; 73/861.38; 141/83
[58] Field of Search ............... 177/145; 73/861.37, 73/861.38; 141/83

[56] References Cited

U.S. PATENT DOCUMENTS

| | | | |
|---|---|---|---|
| 3,330,160 | 7/1967 | Stevenson | 177/145 |
| 3,927,565 | 12/1975 | Pavlin et al. | 73/194 M |
| 4,635,485 | 1/1987 | Lew | 73/861.37 |
| 4,759,223 | 7/1988 | Frost | 73/861.38 |
| 5,044,207 | 9/1991 | Atkinson et al. | 73/861.37 |

*Primary Examiner*—Benjamin R. Fuller
*Assistant Examiner*—Randy W. Gibson
*Attorney, Agent, or Firm*—Gerald E. Linden

[57] ABSTRACT

In order to improve the metering accuracy of a pipe chain conveyor it is proposed that at least one section of a pipe loop, disposed between the filling and discharge openings, is movably resiliently mounted and is supported on at least one force measuring device. The at least one section of the pipe loop supported by the at least one measuring device can be in the form of a pipe bend or a straight pipe section, and can be mounted to a remaining, stationary portion of the pipe loop in yielding manner by means of flexible intermediate elements in order to act on the force measuring device arranged at a distance therefrom.

23 Claims, 7 Drawing Sheets

PIPE CHAIN CONVEYOR

TECHNICAL FIELD OF THE INVENTION

The present invention relates to conveyor mechanisms and, more particularly to a pipe chain conveyor for metering bulk materials such as fertilizers and seeds, or foams and liquids.

BACKGROUND OF THE INVENTION

This invention relates to a pipe chain conveyor for metering bulk materials with a pipe arranged as a pipe loop, in which a conveyor chain with a plurality of entraining disks fixed thereon circulates, and a filling opening and a discharge opening in the pipe.

Such pipe chain conveyors (as known, for example) from U.S. Pat. No. 4,197,938 or DE 30 00 575) are used especially in agriculture to feed bulk materials, such as fertilizers and seeds. However, in recent years, pipe chain conveyors have been increasingly installed in industry for metering bulk materials, since they facilitate a pressure-tight construction and a very variable line of travel. The pipes of the pipe chain conveyor, arranged as a loop, can thus lie opposite one another or flat against each other. The pipe bends can be mounted in arbitrary directions in the line of travel. Moreover the pipe chain conveyor is economical to make, relatively easy to service and capable of being erected with no problems, as well as being dust-tight and creating little noise because of the closed construction.

A disadvantage with the usual structure of the pipe chain conveyor is however that the metering accuracy is relatively low, since the filling of the individual chambers formed between the entraining disks can be non-uniform and moreover, in emptying, conveyed material can stick on the conveyor chain connecting the entraining disks and thus reduce the delivered metered volume. Accordingly marked deviations from the theoretical metering accuracy can arise.

JP 63-300918 discloses a pipe chain conveyor wherein the entire pipe loop is supported at central fulcrums and is acting on an electron; scale to obtain a basic weight numeral (value). However, integration of such a pipe conveyor in existing pipes is not possible. Furthermore, the line of travel is not variable.

SUMMARY OF THE INVENTION

It is therefore an object of the present invention to provide an improved pipe chain conveyor having improved metering accuracy and having a simple structure and a variable line of travel.

This object is met by a pipe chain conveyor for metering bulk materials in particular, with a pipe arranged as a pipe loop, in which a conveyor chain with a plurality of entraining disks fixed thereon circulates, and a filling opening and a discharge opening in the pipe, wherein at least one pipe loop section between the filling and discharge openings is movably mounted relative to the remaining part of the stationarily arranged pipe loop by means of two flexible intermediate elements and is supported on at least one force measuring device.

By supporting at least one partial region (portion) of the pipe loop on at least one weight or force measuring device, gravimetric control over the amounts of material transported by the pipe chain conveyor is obtained. In this manner irregularities, which are unavoidable on account of the variable filling in the volumetric metering, can be reliably ruled out, and material adhering to the chain conveyor and the like can be detected, as well as maintaining the set-point metering amount accordingly in the manner of metering scales with controllable drive.

A particularly simple implementation of the proposed pipe chain conveyor results if a portion of the pipe has a rather thin wall and is merely supported on distant supports such that the pipe may bend downwards by virtue of gravity and act on the weight or force measuring device arranged below.

A similar benefit would result from the movable mounting of a part only of the pipe loop, which is movably mounted through at least two flexible intermediate elements. Simply by undoing the pipe loop and interposing the flexible intermediate elements, especially compensators with restricted movement or rubber bellows, and supporting the movable portion of the pipe loop on the measuring, device it is possible to effect simple retro-fitting of existing pipe chain conveyors.

The embodiment with two pipe loop sections which can move within limits, where one pipe section is arranged before the discharge opening and one after the discharge opening, is especially advantageous, since the actual amount delivered to the discharge opening can be determined by forming the difference, so that a tare measurement can be effected. Of particularly simple construction is the arrangement of two pipe sections opposite one another, which are connected by a link and act on a single force measuring device in the manner of a balance beam, whereby a tare measurement is likewise possible in the simplest of manners.

Further advantageous arrangements appear from the following description of a plurality of embodiments shown in the drawings.

DETAILED DESCRIPTION OF THE INVENTION

DETAILED DESCRIPTION OF THE INVENTION

Figure 1:
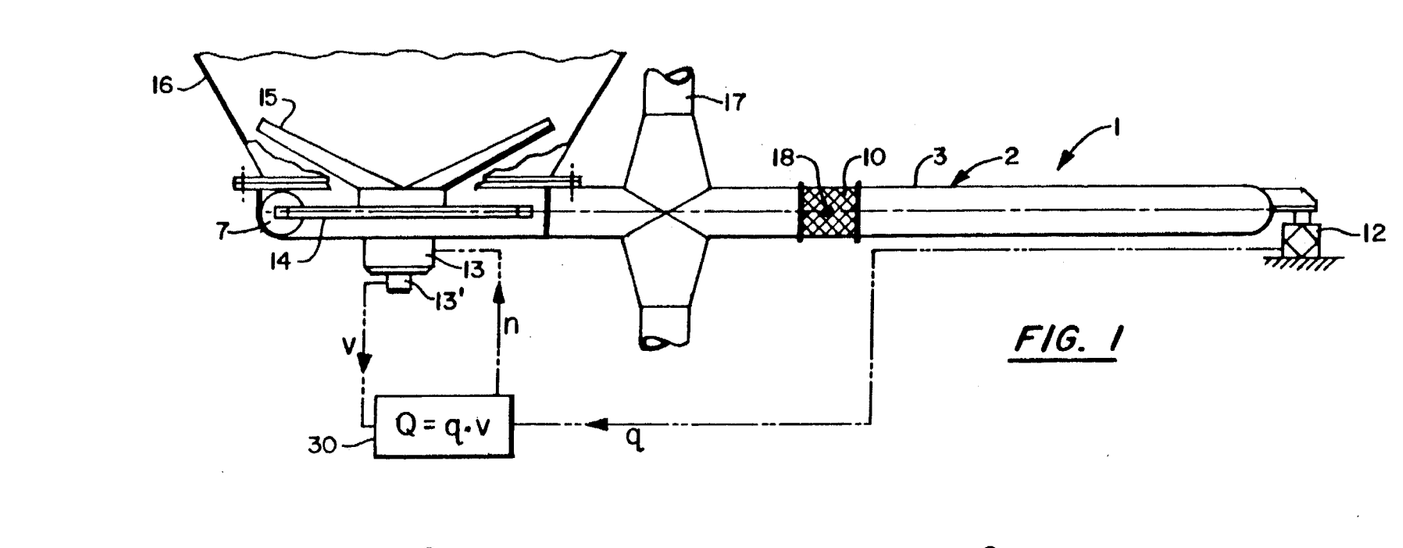
FIG. 1 shows a pipe chain conveyor in side view.
Figure 2:
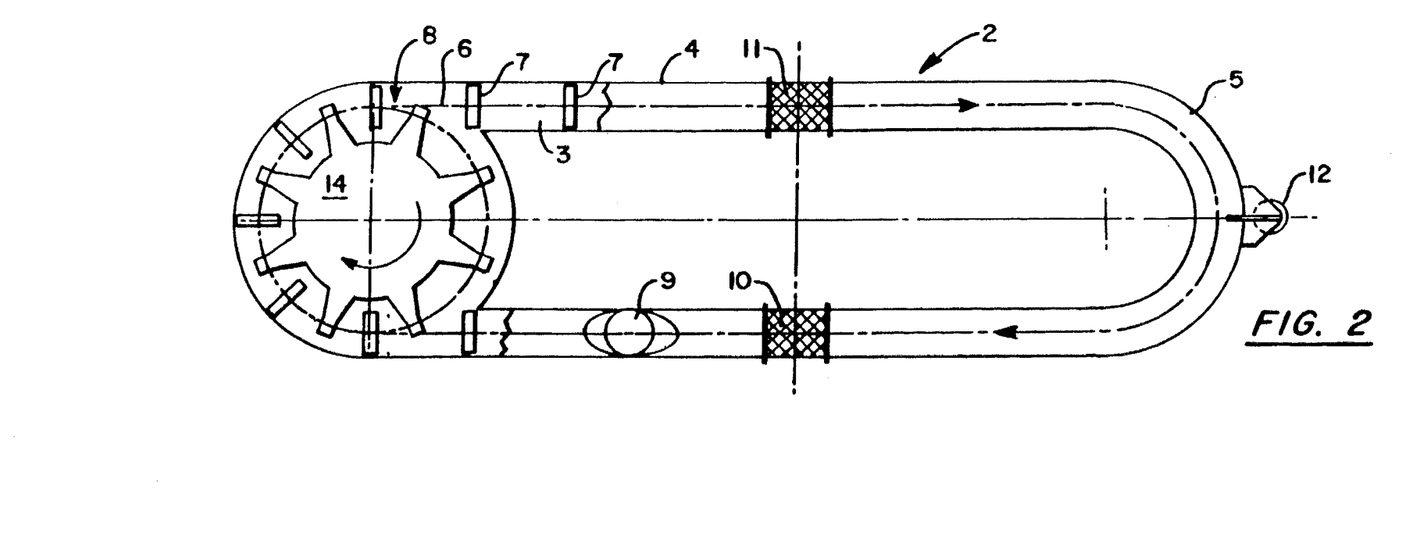
FIG. 2 shows a pipe chain conveyor according to FIG. 1 in plan view.

A pipe chain conveyor 1 is shown in FIGS. 1 and 2, in side view and plan view respectively, consisting essentially of a closed pipe loop 2, which is formed from a pipe with straight pipe sections 4 and two pipe bends 5 at the ends. A conveyor cable or chain 6 runs round the pipe loop 2 or its pipe 3 and comprises uniformly spaced entraining disks 7, which are matched to the pipe 3 (the diameter of the disks 7 matches the bore of the pipe 3). Because of the close fit it is also possible to transport and meter foams or liquids. Additionally, a high resistance to pressure shocks is obtained. With pneumatic discharge, the drive is capable of handling high pressure differences. By means of the entraining disks 7 the conveyed material, which enters the pipe 3 from the filling opening 8, is transported clockwise (in a downstream direction) along the pipe loop 2 to a discharge opening 9, as is here indicated by arrows. Between the filling opening 8 and the discharge opening 9 the right (as view in FIG. 2) pipe bend 5 is, as a part of the pipe loop 2, mounted in a movable or slightly yielding manner by means of flexible intermediate elements 10, 11, which are in particular formed as compensators or rubber bellows, and the right pipe bend 5 is supported on a force measuring device 12 arranged at the right hand end of the pipe loop. The force measuring device 12 is suitably a load cell. It should be noted that the flexible members 10, 11 may also be formed by thinned walls of the pipe loop itself. A drive 13 in the form of a chain wheel 14 is provided at the left end of the pipe loop 2, the coarse teeth of which engage between the entraining disks 7 in the conveyor chain 6. In addition a stirring blade 15 is mounted on the same drive 13, e.g. an electric motor, so that bulk material passes out of a feed hopper 16 into the filling opening 8. After being conveyed along the pipe loop 2, which can be of arbitrary length and also lead into a plurality of loops, the conveyed material reaches the, discharge opening 9, where it can fall out under the influence of gravity or, as here indicated, be blown out by a blow-out line 17. It should be noted that the blow-out line 17 is arranged in the stationary part of the pipe loop 2, so that no interfering moments are exerted on the force measuring device 12 by the force associated with blowing the conveyed material out of the pipe at the discharge opening.

The movable mounting of a section of the pipe loop 2 between the filling and discharge openings is important in this, namely the pipe bend 5 here on the right mounted by the flexible intermediate elements 10 and 11. During the conveying of the bulk material the right pipe bend here can bend slightly relative to the other part of the stationary pipe loop 2 and can thereby manifest a measurable effect upon the force measuring device 12. The force measuring device 12 can be any kind of force measuring device such as a shear force transducer or load cells of inductive, capacitive or piezoelectric basis.

It is preferred to use a force measuring device 12 which is practically free from displacement, especially an elastostatic load cell, since the bending angle of the right pipe bend 5 relative to the other part of the pipe loop 2 can be restricted (may be limited) to a few minutes of arc. By limiting the deflection of the measuring portion 5 of the pipe loop 3, adverse effects on the movement of the conveyor chain 6 can be minimized.

In this manner, a pivotal axis 18 is formed by the flexible intermediate elements 10 and 11, which themselves lie symmetrically relative to the central axis, so that the pipe bend 5 on the right in FIG. 2 can pivot slightly, together with the straight arms.

The force measuring device 12 detecting the weight of the conveyed material feeds the measured value to a computer 30, which computes the instantaneous throughflow amount (0) by forming a product of the measured value of the detected weight of the conveyed material (pipe loop loading q) times the conveyor speed (v). The conveyor speed is suitably derived from the drive 13 by a tacho-generator 13' for example. This actual speed value is compared with a predetermined set-point and the controllable drive is regulated in a manner which will readily be understood by one of ordinary skill in the art to which the present invention most nearly pertains when there are deviations from the predetermined set-point.

Figure 3:
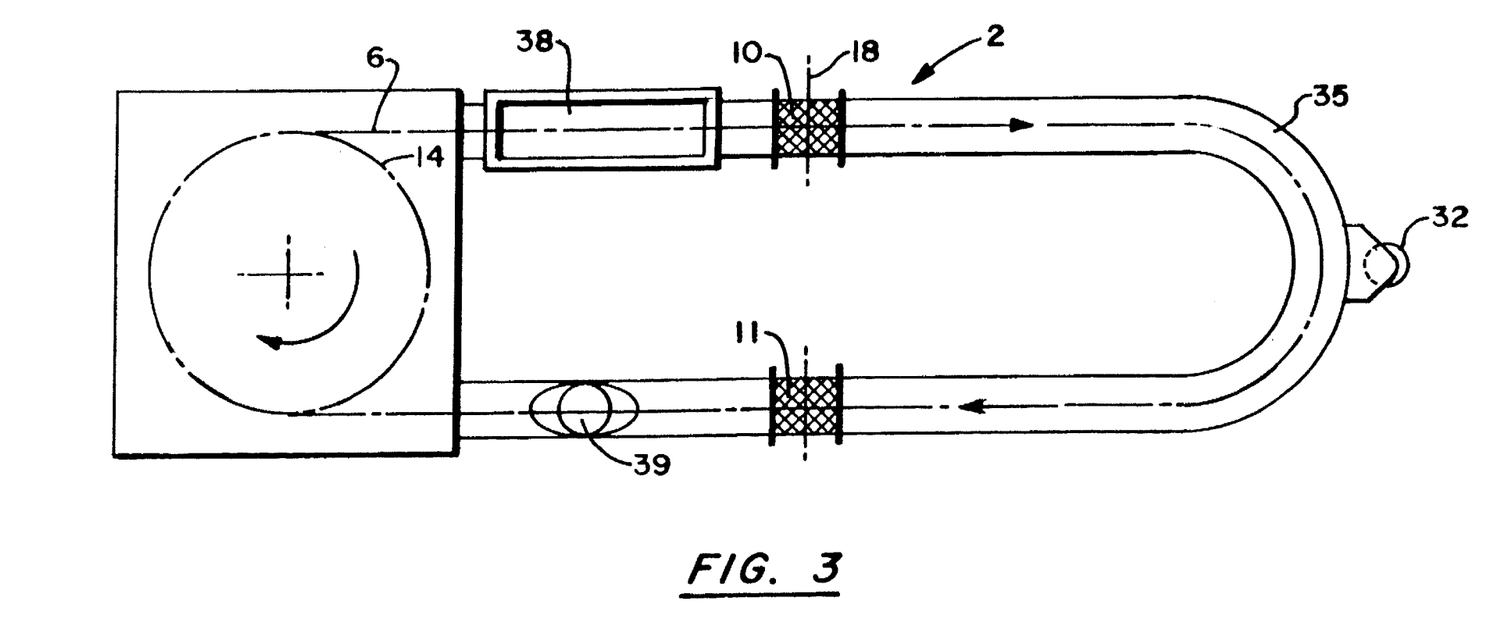
FIG. 3 shows a further embodiment of the pipe chain conveyor in plan view.

In FIG. 3 a modified embodiment of the pipe chain conveyor is shown, in which the filling opening 38 (similar to opening 8) is arranged differently from the embodiment of FIGS. 1 and 2, namely in the pipe 3, separate from the drive station. The drive with the chain wheel 14 can thereby be shifted relative to the pipe 2 for example, to tension the conveyor chain 6. A discharge opening 39 (similar to 9) is disposed downstream of the filling opening 38. A bent section 35 (similar to 5) of the pipe, disposed between the filling opening 38 and the discharge opening 39, is linked to a force measuring device 32 (similar to 12) for determining the amount of conveyed material in the section 35.

Figure 4:
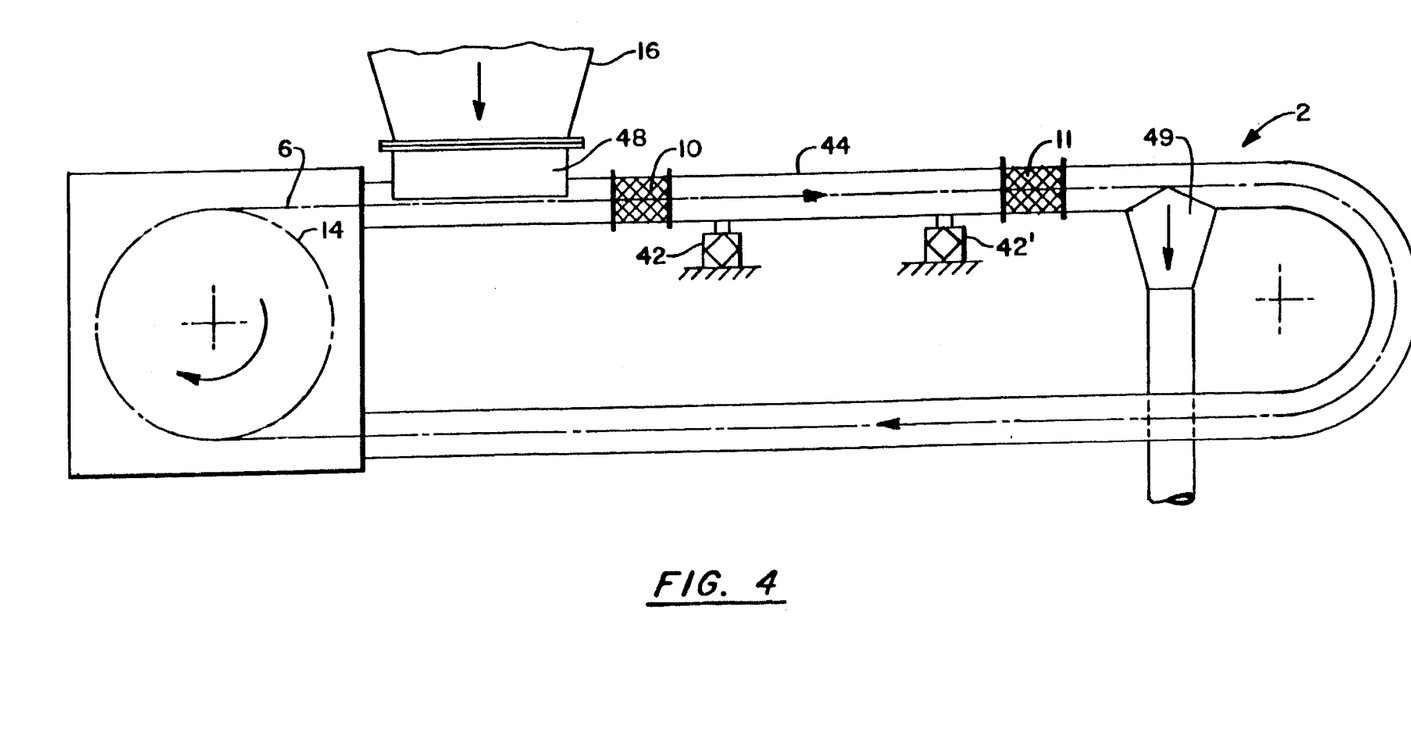
FIG. 4 shows a further embodiment of the pipe chain conveyor in side view.

In FIG. 4 an upright disposition of the pipe loop 2 is shown in contrast to the previously described horizontal arrangements, as can be seen from the arrangement of the feed hopper 16. A filling opening 48 (similar to 8), a discharge opening 49 (similar to 9), and a drive wheel 14 are illustrated. In contrast to the previously described movable mounting of the pipe bend 5, a straight pipe section 44 (similar to 5, but straight) is here, as part of the pipe loop 2, movably (resiliently, deflectably) mounted by means of flexible intermediate elements 10 and 11. In this example, the measuring section 4 is supported on two force measuring devices 42 and 42' (similar to 12; one measuring device towards each end of the measuring section 44), so that the pipe section 4 moves deflects slightly downwards under the load of the conveyed material when conveying and thereby affects the two force measuring devices 42 and 42' in the manner of a weighbridge. After passing the pipe section 44 forming the measuring run and the intermediate element 11, which like the pipe 3 is made as smooth as possible on the inner diameter, the conveyed material reaches the discharge opening 49 and there falls down out of the chambers formed between the entraining disks (not shown).

Figure 5:
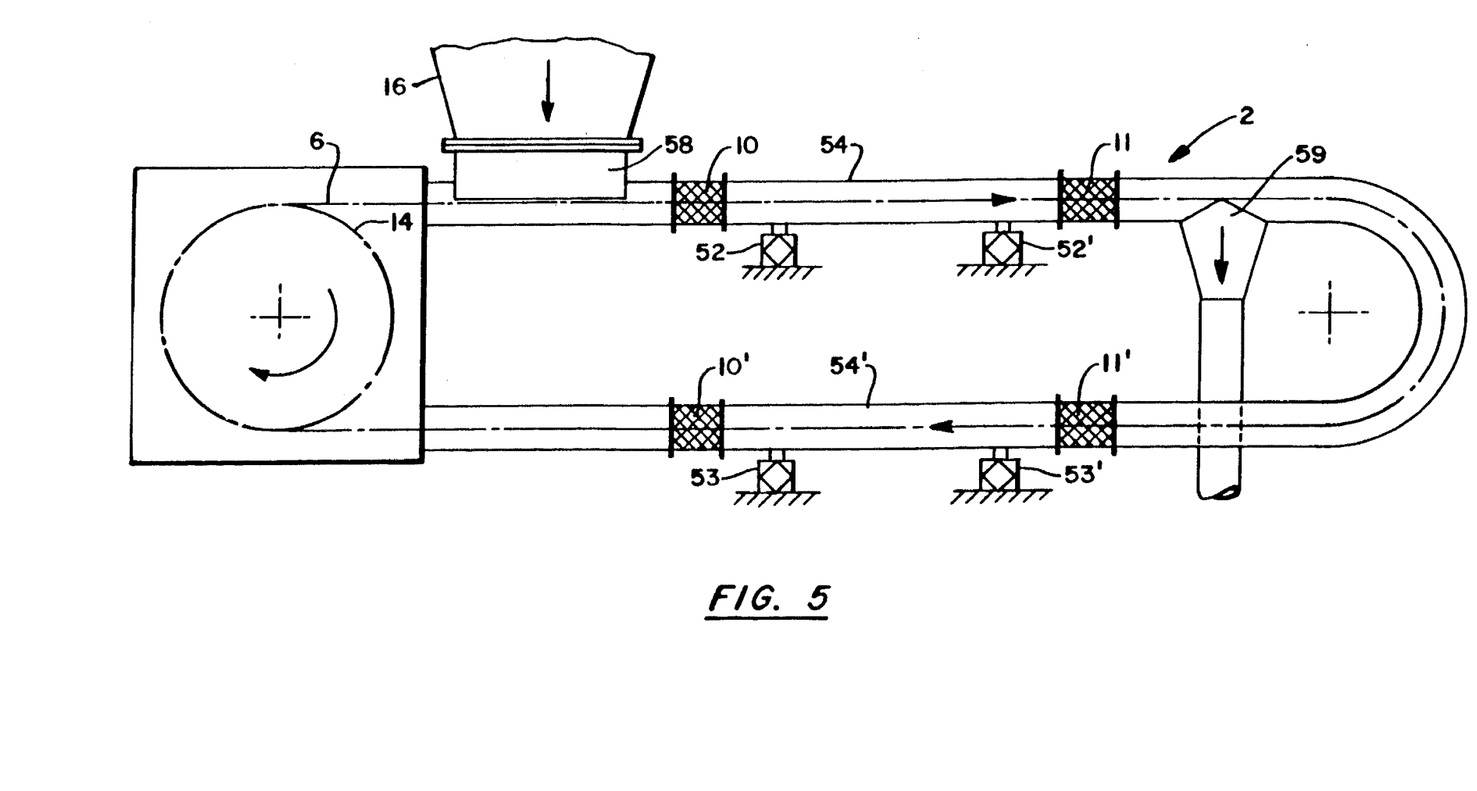
FIG. 5 shows a modified embodiment of the pipe chain conveyor according to FIG. 4.

A modified embodiment of the example shown in FIG. 4 is shown in FIG. 5, having a straight measuring pipe section 54 (similar to 44) between filling opening 58 (similar to 8) and discharge opening 59 (similar to 9), in which a second pipe section 54', downstream of the discharge opening 59 (and presumably devoid of conveyed material which has been discharged), is likewise supported on two force measuring devices 53 and 53' (similar to 12) disposed in the manner of a weighbridge and mounted movably on intermediate elements 10' and 11', being after (disposed downstream of) the discharge opening 59, below the first pipe section 54. The first pipe section 54 is disposed between the filling (inlet) opening 58 (similar to 8) and the discharge (outlet) opening 59 (similar to 9), and is supported by two measuring devices 52 and 52' in a manner similar to the arrangement of FIG. 4 (i.e., a weighbridge arrangement). In this way it is possible to compensate for the dead (tare) weight of the conveyor chain so that, by comparing the two measured values at the upper pipe section 54' and at the second pipe section 54, just the amount of conveyed material leaving at the discharge opening 59 can be determined by forming the difference. Further, in the event that portions of the conveyed material should remain stuck to the entraining disks (not shown) or the conveyor chain 6, only the effective bulk material amount leaving the pipe loop 2 of the pipe chain conveyor 1 can readily be determined. A substantial increase in the measuring and metering accuracy is possible with this tare measurement (i.e., the subtracting of the weight of the section 54' from the weight of the section 54). It should be noted that the pipe section 54' is arranged exactly beneath the upper pipe section 54, as a second (reference, tare) measuring section, so that the sag of the conveyor chain and thus the loading of the force measuring devices is the same in each case and can thus be eliminated from the results of the measurement.

Figure 6:
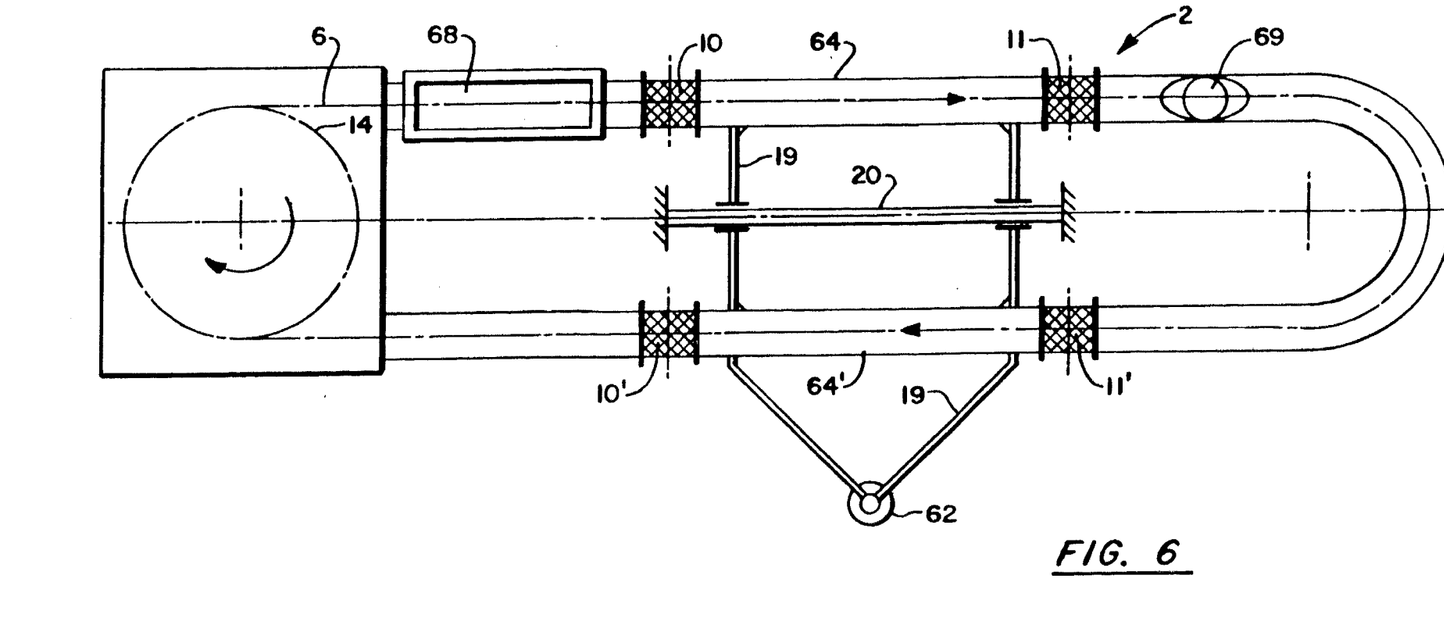
FIG. 6 is a plan view of a pipe chain conveyor for tare weight measurements.

A further development of this measuring principle is shown in FIG. 6 with a horizontal arrangement of the pipe chain conveyor 1. Here again, as in FIG. 5, two opposite pipe sections 64 and 64' are provided and are connected together by a link 19. A first section 64 is disposed between the filling opening 68 (similar to 8) and the discharge opening 69 (similar to 9), and a second section 64' is disposed downstream of the discharge opening 69. This link 19 is mounted on a pivotal axis 20 on the central axis of the pipe loop 2, so that the weight of the conveyor chain is compensated by this two-armed lever and a tare measurement or offsetting of weight is likewise made possible. A particular advantage with this arrangement of the link 19 with the central pivotal axis 20 is that only a single, common force measuring device 62 (similar to 12) is required. In this case a higher weight bears on the pipe section 64 (similar to 54), on account of its loading with the conveyed material, than on the pipe section 64 ' (similar to 54') disposed after the discharge opening 69, so that the force measuring device 62 (similar to 12) is loaded through a rod or a band, here in tension (extending out of the plane of the drawing).

Figure 7:
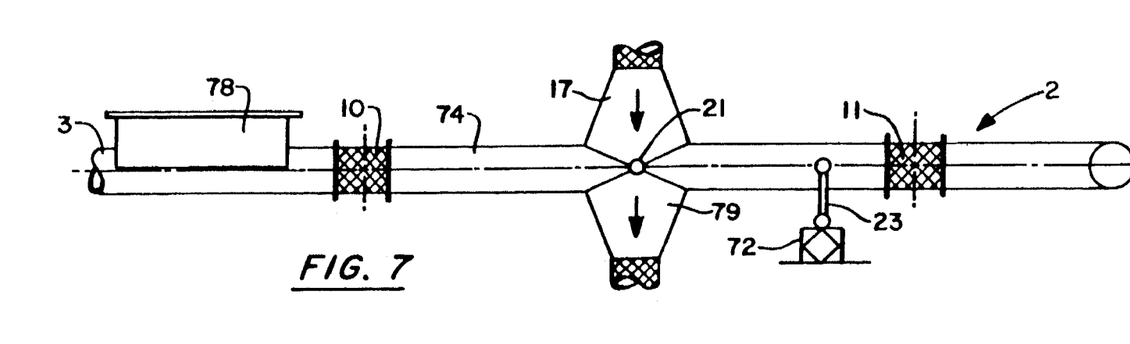
FIG. 7 is a side view of a further embodiment of the pipe chain conveyor.
Figure 8:
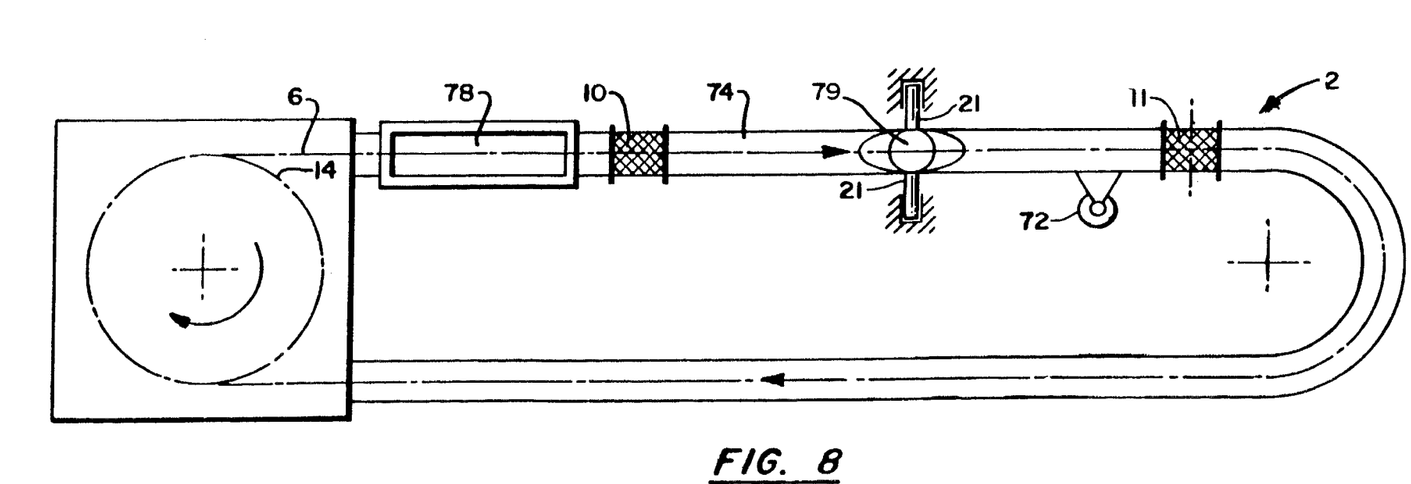
FIG. 8 is a plan view of the pipe chain conveyor according to FIG. 7.

A similar horizontal arrangement of the pipe chain conveyor 1 is shown in FIGS. 7 and 8 in side view and corresponding plan view, where the pipe section 74 (similar to 44) is here mounted in pivot pins 21 projecting from its sides. The pipe section 74 is disposed between the filling opening 78 (similar to 8) and the discharge opening 79 (similar to 9). The pivot pins 21 are here provided approximately in the center of the longitudinal extent of the pipe section 74 and thereby run through the discharge opening 79 (similar to 9) likewise centrally arranged and here equipped with a blow-out line 17. The force measuring device 72 (similar to 12) is here connected to the pipe section 74 through a tie rod 23. The pipe section 74 thus acts as a double lever, where there is a higher weight on the left side of the axis formed by the pivot pins 21 because of the loading with the conveyed material, so that the force measuring cell is loaded in tension through the tie rod 23. Obviously a corresponding mirror image arrangement operating in compression is equally possible. In order to facilitate free movement of the pipe section 74, the blow-out line 17 is connected to elastic, flexible hoses, rubber bellows or compensators. It should be noted that this arrangement can also be used with the movably or yieldingly mounted pipe bend 5 in accordance with the embodiments of FIGS. 1 to 3.

Figure 9:
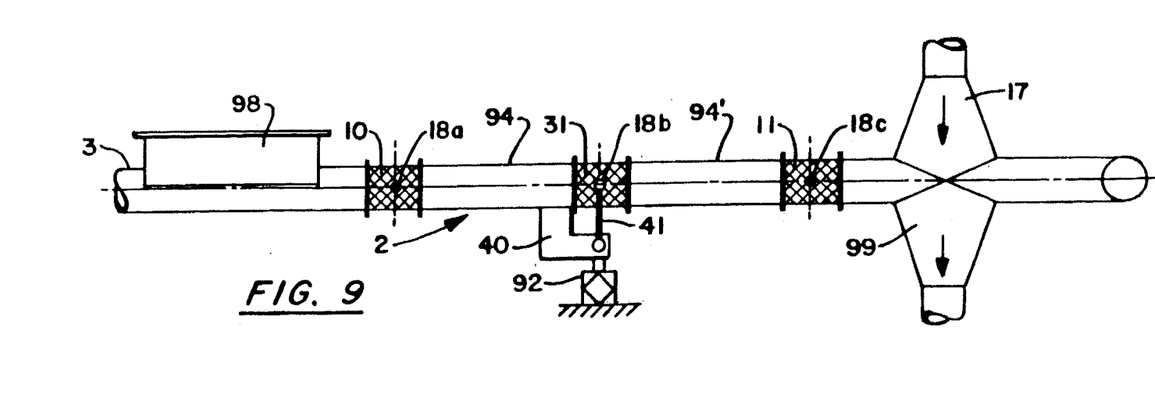
FIG. 9 shows a further embodiment of the pipe chain conveyor.
Figure 10:
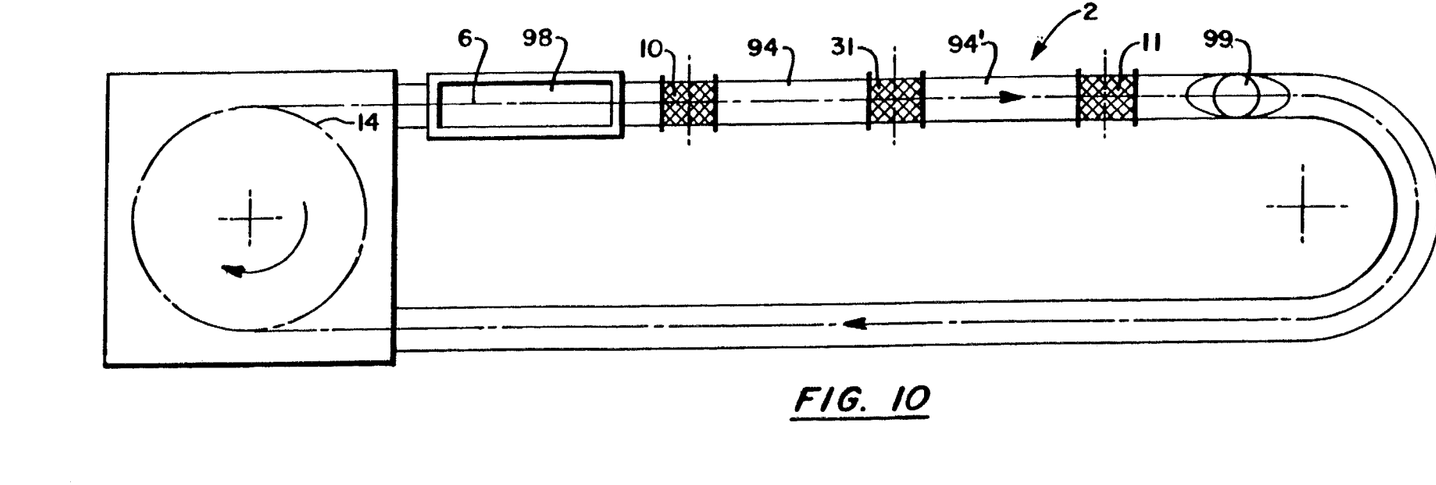
FIG. 10 is a plan view of the pipe chain conveyor according to FIG. 9.

A horizontal arrangement of a further embodiment of the pipe chain conveyor 1 is shown in FIGS. 9 and 10, in side and plan views respectively. The region of the pipe loop 2 between the filling opening 98 (similar to 8) and the discharge opening 99 (similar to 9) is here provided with two pipe 94 and 94' arranged directly one after the other, which are connected to the rest of the pipe loop 2 through three flexible intermediate elements 10, 11 and 31. The force measuring device 92 (similar to 12) is here arranged below the central intermediate element 31 and supports both the left pipe section 34 through a bracket 40 and the right pipe section 94' through a strut 41. Because of the flexible intermediate elements, three pivotal axes 18 a, 18b and 18c result, so that the pipe loop 2 as seen in side view can bend slightly into a V shape. As mentioned hereinabove with respect to FIG. 1 this bending movement only involves a bend angle of a few minutes or seconds of arc, so that the circulating movement of the conveyor chain 6 is not impeded. As shown at the top end of the strut 41, a pivoting intermediate element can also be used with bearing pins and bearing eyes, instead of a rubber bellows or a compensator. Since however rubber bellows or compensators with accordion surfaces have very low friction, they are preferably employed.

It should be noted that in all embodiments the measured value of the force measuring device(s) are fed to processing electronics known per se, as represented in FIG. 1 as an example by the computer 30 for calculating the instantaneous conveyor load Q from the pipe loop loading q and conveyor speed v, which is compared with the selected set point. By accelerating or braking the drive 13 of the pipe chain conveyor 1, for example by electronic speed regulation (computer output n in FIG. 1), the desired metered amount (conveyor load) can be maintained or regulated.

I claim:

1. A pipe chain conveyor comprising:
   a pipe arranged in a loop;
   a conveyor chain with a plurality of entraining disks fixed thereon circulating through the pipe, the entraining disks disposed within the pipe for conveying material through the pipe;
   a filling opening disposed at a first position in the loop for receiving material to be conveyed into the pipe; and
   a discharge opening disposed at another position in the loop for discharging conveyed material from the pipe;
   wherein:
   a first measuring portion of the pipe loop, disposed between the filling and discharge openings, is resiliently mounted with respect to a stationary portion of the pipe loop, to deflect in response to conveyed material within the first measuring portion; and
   further comprising:
   first means for measuring deflection of the first measuring portion.

2. A pipe chain conveyor according to claim 1, wherein:
   the first means for measuring is at least one force measuring device.

3. A pipe chain conveyor according to claim 1, wherein:
   the first measuring portion is a bent pipe section having an axis of symmetry; and
   the first means for measuring is arranged on the axis of symmetry of the pipe bend.

4. A pipe chain conveyor according to claim 1, wherein:
   the first measuring portion is a straight pipe section.

5. A pipe chain conveyor according to claim 4, wherein:
   the means for measuring includes two first force measuring devices; and
   the first measuring portion is supported on the two first force measuring devices.

6. A pipe chain conveyor according to claim 5, wherein:
   each of the two first force measuring devices is disposed at a respective one of two ends of the straight pipe section.

7. A pipe chain conveyor according to claim 1, further comprising:
   a second measuring portion of the pipe loop disposed downstream of the discharge opening and resiliently mounted with respect to the stationary portion of the pipe loop; and second means for measuring deflection of the second measuring portion.

8. A pipe chain conveyor according to claim 7, wherein: the second means for measuring is at least one force measuring device.

9. A pipe chain conveyor according to claim 7, wherein: the second means for measuring is connected to the first means for measuring.

10. A pipe chain conveyor according to claim 7, wherein: the first measuring section and the second measuring section are disposed opposite one another in the loop and are connected to one another by a link, said link mounted on a central pivotal axis, and said link supported by a single, common means for measuring which subsumes the first and the second means for measuring and which is a force measuring device.

11. A pipe chain conveyor according to claim 4, wherein: the straight pipe section is mounted centrally relative to its axial length on lateral pivot pins and is supported on the first means for measuring which is a force measuring device spaced from the pivot pins.

12. A pipe chain conveyor according to claim 7, wherein: the first and the second measuring portions are straight pipe sections disposed one directly after the other and are joined to one another at a one end of each by a first flexible element;

another end of each of the first and the second measuring portions is joined by a second flexible element to the stationary portion of the pipe loop; and the means for measuring is disposed below the first flexible element.

13. A pipe chain conveyor according to claim 12, wherein: the flexible elements are formed as rubber bellows.

14. A pipe chain conveyor according to claim 1, further comprising:

flexible elements joining ends of the first measuring portion to the stationary portion;

wherein:
the flexible elements are formed by compensators.

15. A pipe chain conveyor according to claim 1, further comprising:

flexible elements joining ends of the first measuring portion to the stationary portion;

wherein:
the flexible elements are formed as rubber bellows.

16. A pipe chain conveyor according to claim 1, further comprising:

flexible elements joining ends of the first measuring portion to the stationary portion;

wherein:
the flexible elements are formed as thinned pipe walls.

17. A pipe chain conveyor according to claim 1, further comprising:

means for blowing conveyed material out of the discharge opening.

18. A pipe chain conveyor according to claim 17, wherein: the means for blowing-out and the discharge opening, are both disposed at an intermediate position on the first measuring portion.

19. A pipe chain conveyor according to claim 18, wherein: the means for blowing-out is connected centrally to the first measuring section through one or more flexible elements.

20. A pipe chain conveyor according to claim 17, wherein: the means for blowing-out is disposed at a position on the stationary portion of the pipe loop.

21. A pipe chain conveyor according to claim 1, further comprising:

means for measuring a speed (v) at which the material is being conveyed through the pipe loop;

a computer connected to the means for measuring and to the means for determining the speed (v);

wherein:
the means for measuring provides a measured weight value (q); and an instantaneous throughflow (Q) of conveyed material is determined in the computer as a product of the measured weight value and the speed ($Q=q \cdot v$).

22. A pipe chain conveyor according to claim 21, wherein: the computer regulates a desired speed for conveying material through the pipe loop by comparing the instantaneous throughflow of conveyed material with a setpoint and by outputting a signal to a controller for controlling the conveyor speed.

23. Method of measuring metering bulk materials comprising:

receiving bulk materials into a pipe loop at a first position in the pipe loop;

conveying the bulk materials in a downstream direction through the pipe loop;

discharging the bulk materials from the pipe loop at a section position in the pipe loop downstream of the first position;

permitting a first section of the pipe loop between the first and second positions to deflect relative to a remaining, relatively stationary position of the pipe loop;

weighting the first section of pipe loop between the first and second positions;

providing a second section of pipe loop beneath the first section of pipe loop;

permitting the second section of the pipe loop downstream of the second position to deflect relative to the remaining, relatively stationary portion of the pipe loop; and weighting the second section of pipe loop, and subtracting the weight of the second section of pipe loop from the weight of the first section of pipe loop of determine the amount of material in the first section of pipe loop.

* * * * *